United States Patent [19]

Martin

[11] Patent Number: 4,676,531
[45] Date of Patent: Jun. 30, 1987

[54] APPARATUS FOR CLAMPING AND SEALING THE OUTER SURFACE OF A PIPE AND FITTINGS FOR PIPE CONNECTION

[76] Inventor: Charles F. Martin, P.O. Box 197, Porter, Tex. 77365

[21] Appl. No.: 723,305

[22] Filed: Apr. 15, 1985

[51] Int. Cl.$^4$ .............................................. F16L 17/00
[52] U.S. Cl. .................................... 285/96; 285/97; 285/382.7; 285/924; 285/261; 285/226
[58] Field of Search .................... 285/97, 96, 382, 105, 285/924, 261, 382.7; 277/34.3

[56] References Cited

U.S. PATENT DOCUMENTS

| | | | |
|---|---|---|---|
| 2,083,842 | 6/1937 | Henning | 285/97 X |
| 2,451,354 | 10/1948 | Ohls . | |
| 3,236,544 | 2/1966 | Brown | 285/97 |
| 3,420,554 | 1/1969 | Straub | 285/97 |
| 3,572,769 | 3/1971 | Lingi | 285/369 X |
| 3,718,350 | 2/1973 | Klein | 285/924 X |
| 3,860,270 | 1/1975 | Arnold | 285/93 |
| 3,874,706 | 4/1975 | Arnold | 285/24 |
| 3,915,480 | 10/1975 | Kish et al. | 285/382 X |
| 3,944,263 | 3/1976 | Arnold | 285/96 |
| 3,997,197 | 12/1976 | Marsh et al. | 285/93 |
| 4,005,881 | 2/1977 | Burton et al. | 285/111 |
| 4,045,054 | 8/1977 | Arnold | 285/18 |
| 4,153,280 | 5/1979 | Bunyan | 285/97 |
| 4,171,833 | 10/1979 | Eijkelenboom | 285/261 |
| 4,371,198 | 2/1983 | Martin | 285/165 |
| 4,373,377 | 2/1983 | Smith et al. | 285/97 X |

FOREIGN PATENT DOCUMENTS

| | | | |
|---|---|---|---|
| 72199 | 2/1983 | European Pat. Off. | 285/97 |
| 36064 | 1/1930 | France | 277/34.3 |
| 537748 | 1/1956 | Italy | 277/34.3 |
| 351462 | 2/1961 | Switzerland | 285/96 |
| 650641 | 2/1951 | United Kingdom | 277/34.3 |
| 1345514 | 1/1974 | United Kingdom | 285/97 |
| 1401438 | 7/1975 | United Kingdom | 277/34.3 |

Primary Examiner—Thomas F. Callaghan
Attorney, Agent, or Firm—Browning, Bushman, Zamecki & Anderson

[57] ABSTRACT

For use with a pipe having an outer surface, a clamping structure is set forth. In the preferred and illustrated embodiment, the device utilizes a surrounding ring of solid construction having a central passage fitting over the pipe in question. An internal groove is formed in the ring. An encircling clamp means is placed in the groove which has an exposed or outer face confronting the pipe. The clamp means is fabricated with the outer face supported on a pair of spaced sidewalls which are corrugated along their length. On application of pressure to the interior of the ring, the corrugations are straightened, driving the outer face into the pipe and thereby clamping.

23 Claims, 17 Drawing Figures

APPARATUS FOR CLAMPING AND SEALING THE OUTER SURFACE OF A PIPE AND FITTINGS FOR PIPE CONNECTION

BACKGROUND OF THE DISCLOSURE

This disclosure is directed to apparatus for clamping about a pipe, and particularly pipes to be placed at sub-sea locations. In gathering lines for underwater wells, distribution lines for offshore production platforms and the like, it is often necessary to perform underwater connections. While pipe is ordinarily joined either by welding or by bolted flange construction, underwater connections are more difficult to accomplish by these techniques. This apparatus sets forth a telescoping structure which enables a relatively quick and easily achieved clamping action whereby a pipe is joined. Certain devices of James Arnold, and the company associated with him, are set forth as the prior art. These devices are shown as, for example, in U.S. Pat. Nos. 3,860,270; 3,874,706; 4,045,054; 4,005,881; 3,997,197 and 3,944,263. Additional art is shown in U.S. Pat. Nos. 2,451,351; 3,236,544; 3,420,554; 4,153,280 and 4,371,198. Generally speaking, the present apparatus features a clamping mechanism which clamps the pipe so firmly that it takes a "bite" into the sidewall of the pipe. This assures positive engagement between the clamp mechanism and the pipe. Positive engagement is obtained by driving the exposed or outer face of the clamp mechanism into the pipe sufficiently to embed teeth in the pipe, thereby taking a bite. This bite is characterized by cutting into the pipe sufficient to deeply embed the teeth in the wall of the pipe whereby positive engagement is obtained. The outer face is preferably fabricated with a set of parallel teeth extending along the length of the face so that the teeth cut and bite the pipe, assuring a leakproof and slipproof connection.

Various and sundry fittings are also set forth utilizing the connective apparatus of this disclosure featuring a clamping ring which is driven sufficiently hard into the pipe that it forms an embedded impression in the pipe.

The clamping apparatus of this disclosure utilizes a surrounding ring with groove therein. The groove receives and supports the encircling clamp means. The encircling clamp means stands taller than groove depth. The clamp means has a face received in the groove. In addition, it has an exposed or outer face which confronts the pipe to be clamped. Moreover, this exposed face is supported on a pair of side walls so that, in cross section, the clamp means comprises an outer face for pipe contact, a pair of supporting side walls, and a back wall (as needed) to close the clamp means and thereby define a hollow ring. On the interior, the hollow cavity is provided to be inflated with suitable high pressure fluid as will be described. The side walls are more or less radially directed, except that they are formed originally with a corrugations. The corrugations in each sidewall are shaped so that the corragation folds extra material whereby side walls can be subsequently extended. When extended, the side walls are forced radially outwardly from the groove and thereby thrust the outer face against the pipe. This is accomplished with such force that a radial clamping action, not untypically less than perhaps a million pounds of hoop stress, is imparted to the outer face causing it to embed in the pipe.

The corrugations in the side walls are thus straightened to take on the shape of the surrounding groove. When straightened, they prop up the exposed outer face and hold it in a rigid fashion to assure clamping action.

Certain connective fixtures are fabricated utilizing the apparatus described to this juncture, the fixtures being shown in multiple embodiments for the purpose of constructing a quality clamp mechanism. While these and other features will be noted on a review of the detailed description written below, the structure is best understood on a review of the drawings which are first encorporated and described.

DRAWINGS

So that the manner in which the above-recited features, advantages and objects of the present invention, as well as others which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

DETAILED DESCRIPTION OF THE PREFERRED EMBODIMENTS

Figure 1:
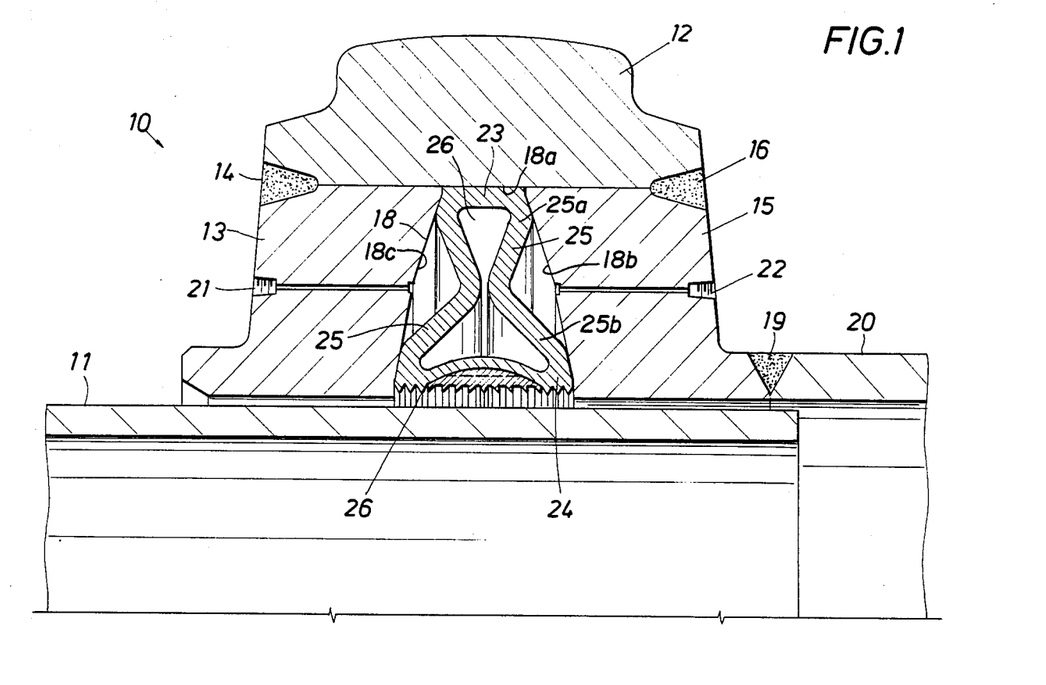
FIG. 1 is a sectional view through a surrounding ring with groove enclosing an encircling clamp means, all for the purpose of fastening around a pipe, the view being in cross-section to show the clamp means in a retracted position as a result of the corrugated side walls.

Attention is first directed to FIG. 1 of the drawings where the pipe clamping apparatus this disclosure is identified generally by the numeral 10. It is used to clamp a pipe 11 of some nominal diameter. Typically, the pipe 11 will be in the range of from 4 to 24 inches although larger embodiments can be made. The pipe 11 is typically clamped to assemble into a pipeline in conjunction with additional pipe (not shown). The pipe 11 has a wall thickness which is suitable to accept the clamping action which is described hereinafter. Typically, the wall thickness is determined by the schedule for the pipe, and to this end, can be varied over a wide range.

The clamping apparatus of this disclosure comprises a surrounding ring. In this instance, the ring is built up of multiple components for ease of assembly. Thus, the ring comprises a surrounding outer metallic ring member or collar 12. A left internal ring portion 13 is welded at 14 to the outer ring 12. A similar ring portion 15 is likewise welded at 16. The ring portions 13 and 15 are symmetrical to one another. They do not span the full width of the ring portion 12; they are spaced from one another to define an internal groove 18. The groove 18 is on the interior of the ring and is defined generally by an annularly extending engagement surface 18a and opposed, first and second, annularly extending abutment walls 18b and 18c, respectively. As shown in FIG. 1, walls 18c and 18b define frustoconical surfaces which are converging, i.e. groove 18 is tapered radially outwardly. Thus, the ring is built of the several components and is sized to fit around the pipe 11 with a fair clearance. This accommodates pipe which is not perfectly round or which is slightly off schedule in wall thickness. The gap between the ring construction and the pipe is relatively large to assure that the ring will fit around the pipe. In this particular instance, the ring is affixed by a weld 19 to a sleeve 20 which is part of connective apparatus not fully shown in this view. The sleeve 20 thus may extend to the right and connect with a suitable second pipe so that a telescoping pipe joint connection can be formed. Alternatively, the ring 12 can be affixed to a pipe fitting through the sleeve 20 of any suitable construction including a welded fitting, flange terminated fitting, or utilizing alternate means of attachment to the several pipes, or for connection to any other type of facility.

The groove 18 has the appearance of a V-cut groove. Of course it is inverted as shown in FIG. 1 i.e., as noted above, it is tapered radially outwardly. There is a cavity which is defined within the ring by the clamp means to be described, this cavity being voided by means of a passage 21. A similar passage on the opposite side at 22 is likewise included. As will be observed in the description hereinafter, the passages 21 and 22 evacuate air or water from adjacent the clamp means as will be described. This evacuation arises on setting of the clamp means which is illustrated in the contrast between FIGS. 1 and 2. One or more such passages is included for the surrounding ring means. Thus, it is highly desirable to evacuate both sides in the manner shown in FIG. 1. A clamp means is inserted into the groove. It is typically positioned in the groove at the time of manufacture as, for instance, by first welding the inside ring element 13 to the ring element 12. The clamp means is then positioned against the ring element 13 and thereafter, the ring element 15 is attached and welding in location. This captures the clamp means in the groove. The clamp means is comprised (referring to the sectional view of FIG. 1) of four wall components. The numeral 23 identifies a first end wall. By contrast, the numeral 24 identifies a second end wall defining an outer face, referring to that portion of the clamp means which is brought into contact with the pipe 11. The outer face is thus exposed to the pipe to grip around it. Details of this will be set forth hereinafter. The numeral 25 identifies the duplicate side walls. The side walls are duplicate and differ from one another only in deployment left and right between the back wall 23 and the outer face. It will be observed that the side walls 25 are folded or corrguated i.e., each of the side walls 25 includes a first, annularly extending run portion 25a and a second, annularly extending run portion 25b, the first and second run portions 25a and 25b being at an angle to one another as shown.

Figure 2:
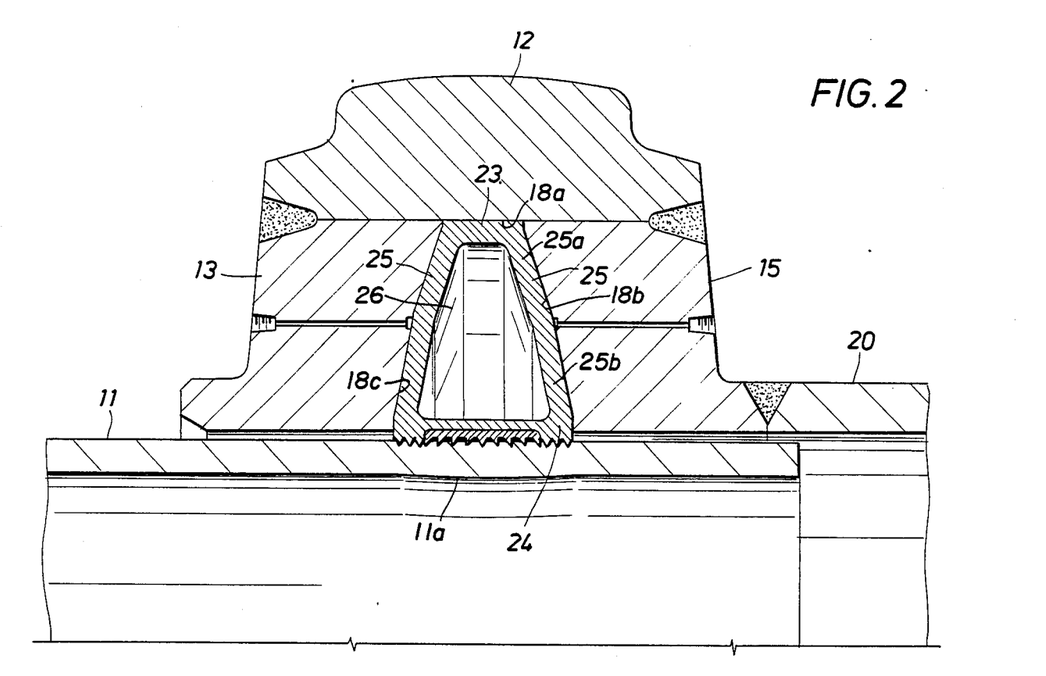
FIG. 2 is a view similar to FIG. 1 showing the clamp means extended as a result of straightening the side walls on the application of pressure whereby the pipe has been clamped by embedment.

Consider the fact that the structure being described is a full ring or encircling structure in other words, the clamp defines an annular, metallic diaphragm which is positioned in the groove 18 and which has an annular chamber 26 formed therein. The corrugations extend fully about the circle. The corrugations enable the side walls to stand to a specified height within the groove 18 as shown in FIG. 1. There, the outer face is positioned approximately flush with the surrounding ring-like structure. The teeth of the outer face are not yet able to engage the pipe 11. With reference to FIG. 2, when an incompressible medium is introduced into chamber 26, side walls 25 are moved from the first rigid position shown in FIG. 1, i.e. wherein run portions 25a and 25b are at an angle to one another, to the second rigid position shown in FIG. 2, i.e., wherein run portions 25a and 25b are substantially aligned with one another, the walls 25 engaging the abutment walls 18b and 18c. It can thus be seen that each of the side walls 25, in essence, forms a continuous, annularly extending toggle, the arms of which are defined by annular run portions 25a and 25b, the toggles being moved from the first position shown in FIG. 1 to the second position shown in FIG. 2, the position shown in FIG. 2 depicting, in essence, a condition where the toggles have been moved over center with the arms substantially aligned. In the position shown in FIG. 2, when run portions 25a and 25b are aligned, the side walls 25 form generally radially disposed, annularly extending struts which are in compression between the pipe 11 and engagement surface 18a in metallic collar 12. The generally radially directed force exerted by the toggle action of the side walls 25 in moving to the second position is sufficiently great to result in a cold forging of pipe 11 such that an annular necked in portion 11a is formed having an internal diameter slightly less than the nominal internal diameter of pipe 11. It can also be seen that abutment walls 18b and 18c serve as stops to limit the movement of side walls 25 outwardly when chamber 26 is expanded. The outer face is in the clamped position as a result of this radial extension. The side walls are substantially the same thickness but they are straightened in the sense that they stand taller or, restated, they drive the outer face into the gripping position.

As will be further observed, the corrugations in the side walls 25 define a gap or cavity within the internal groove but on the exterior of the clamp means. As shown in FIG. 2, that volume is now on the interior of the clamp means. Thus, the interior volume is markedly increased, perhaps 100% or so. Further, any air or water accumulated in the groove means adjacent to the clamp means, but not on the interior of it, is forced out of the area through the passages 21 and 22. This prevents the trapping of fluid under back pressure which might prevent closure of the clamping mechanism. When this closure occurs, it is thus accompanied by the straightening of the side walls which simultaneously changes the interior volume of the clamp means and which additionally drives the exposed outer face against the pipe 11 to achieve clamping action. Clamping is accomplished by driving the exposed outer face into the pipe. To this end, the outer face is constructed with teeth identified at 26. The teeth cause the outer face to embed, cutting grooves in the pipe. The degree or measure of embedment depends upon a number of scale factors. However, it is no uncommon to observe embedment to the degree of 0.030 inches into the pipe 11. Additionally, as shown in FIG. 2, there is a cold forging of pipe 11 radially inwardly to form an annular bulge or necked in portion 11a ensuring positive gripping between metallic collar 12 and pipe 11.

Figure 3:
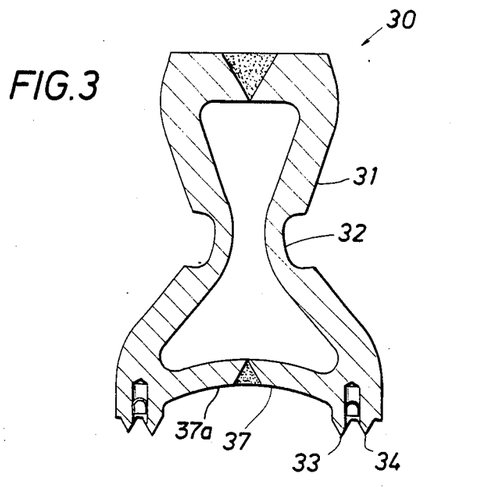
FIG. 3 is a sectional view through a clamp means wherein a modified arrangement of the clamp means is illustrated including a modified set of teeth on the outer face.
Figure 4:
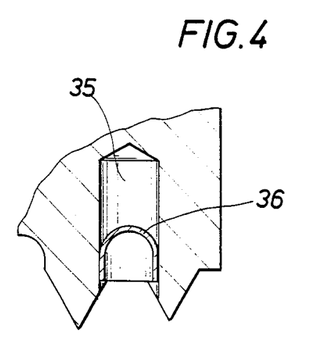
FIG. 4 is an enlarged detailed view of a pressure relief chamber and closure therefor incorporated in the embodiment of FIG. 3.

Attention is now directed to FIG. 3 of the drawings, where the numeral 30 identifies an alternate embodiment of the clamp means. This one has an outer wall 31 having a series of dimples 32 which assist in forming the corragation that extends along the ring-like member. As observed in FIG. 1, the corragation is formed by rolling the outer wall, not thinning the material as shown it at 32. In either case, it is helpful to provide the corragation so that the outer wall can extend radially outwardly upon pressurization, either using the dimples, a groove, or no thinning of the metal stock. In the embodiment of FIG. 3, the outer face includes parallel duplicate teeth at 33 and 34. If the intended seal is accomplished, there is a gap between the teeth 33 and 34 which is isolated and any pressure fluid which is in this gap is captured. If it is incompressible water, this particularly poses a problem because water will prevent the teeth 33 and 34 from embedding to the intended depth. A pressure relief chamber is shown between the teeth 33 and 34. In FIG. 4 of the drawings, the numeral 35 identifies a drilled hole which is temporarily closed by a spherical insert 36. The insert has the curved bottom on a sleeve which is friction fitted into the drilled hole 35. The sleeve should have a friction fit so that does not move easily. This enables the sleeve to move towards the bottom of the hole 35 when extremely high pressures are experienced as, for instance, when the parallel teeth 33 and 34 take a bite into the pipe and accomplish the necessary closure.

Figure 5:
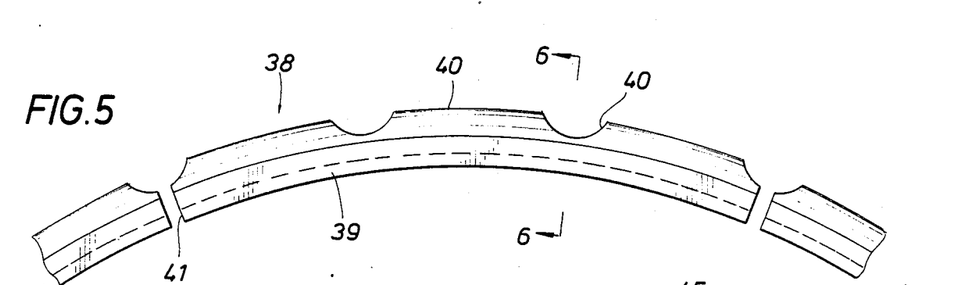
FIG. 5 is a side view of an insert ring which is positioned between the outer face and the pipe to be clamped showing details of construction thereof.
Figure 7:
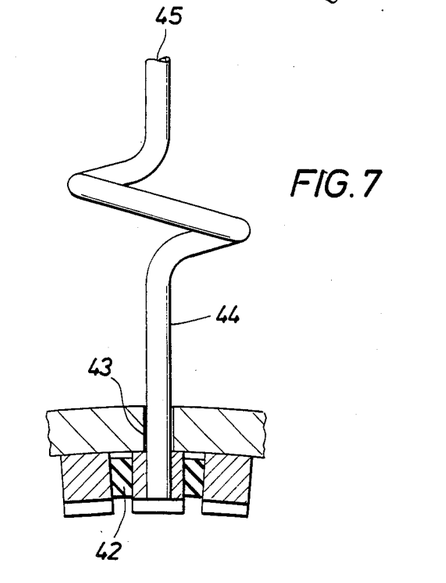
FIG. 7 is a view of a modified insert ring including a bleed tube which extends through the apparatus to prevent the trapping of air or water by operation of the device.

Returning now to FIG. 3 of the drawings, the numeral 37 identifies the outer face which is shown with a relatively high clearance over the pipe. This arched outerface defines a generally shallow, annularly extending depression 37a which receives an insert 38 shown in FIG. 5. The insert is ring-like to cooperate with the ring-like construction of the clamp means 30. The insert is formed with teeth at 39 for clamping and gripping the pipe. The outer face of the insert at 40 is curved and contoured to fit against the high arched face 37 of the clamp means. It has a width to fit against the arched face 37. Periodically, it is notched at 40 to provide compression relief areas. That is, when a hoop stress is applied around the insert 38, some shrinkage of its circumference occurs. This is accommodated in part by the notches at 40. Likewise, the insert 38 is made in segments including the gap at 41 to enable additional shrinkage. This gap is included so that the hoop does not tighten up and resist the setting of the outer ring. The gap 41 can be suitably filled with an insert of resilient material. At one or more locations around the exterior, the gap 41 is filled with rubber as exemplified at 42 in FIG. 7. Additionally, the insert is drilled with a hole at 43 to enable an evacuation tube 44 to be opened to the interior. When installed, the evacuation tube 44 is located in the vicinity of the arched outer face 37 shown with the embodiment 30. This evacuation tube is coiled and has a length enabling the outer end 45 to be located on the exterior of the equipment for evacuating the trapped chamber on the interior. The tube 44 may require a drilled hole through the clamp means, the hole being sealed to prevent leakage into the clamp means. Thus, when the clamp means is expanded to take a bite in the pipe, there is an isolated volume which is potentially filled with water and which, in that case, would resist setting of the clamp means because water is considered incompressible. The evacuation tube 44 thus locates the outlet 45 at a suitable place where any liquid trapped by the clamp means is expelled without impeding clamping action.

Figure 6:
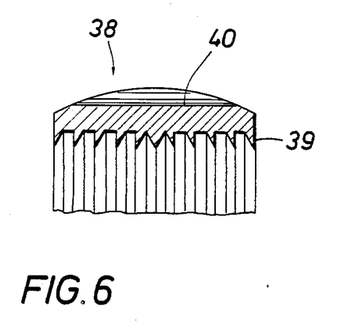
FIG. 6 is a sectional view taken along the line 6—6 of FIG. 5 showing details of construction of the gripping teeth on the insert ring of FIG. 5.

The insert 38 is shown in FIG. 6 to have two sets of teeth, one facing to the left and the other facing to the right. The two sets of teeth are included with this particular embodiment, and the insert 38 can be used with any of the clamp embodiments shown and described in this disclosure. It is held in place initially only by dimensional locking with the clamp means. After the clamp means has been set, the insert 38 is deformed and the teeth on it likewise take a bite in the pipe. To this end, it preferably has teeth on the inside face as shown in FIG. 6.

Figure 8:
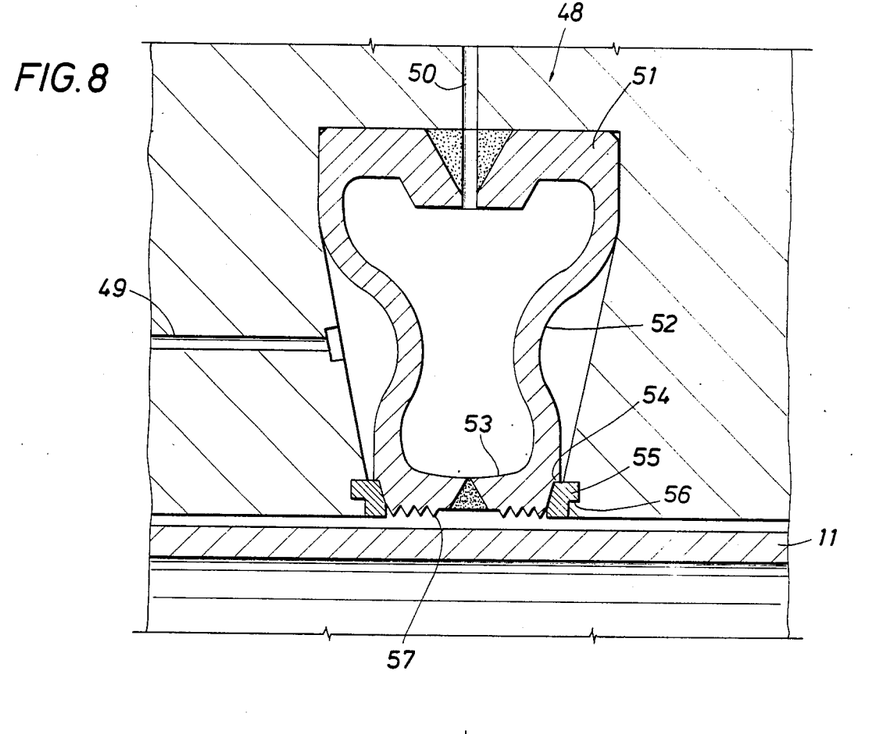
FIG. 8 shows an alternate embodiment to that shown in FIG. 1 wherein the side walls converge rather than diverge to define a more narrow outer face.

Attention is now directed to FIG. 8 of the drawings where an alternate embodiment is shown, a clamp means being identified by the numeral 48. The clamp means 48 is again installed in a surrounding ring means of similar construction to that shown in FIG. 1. Whether it is made of one or multiple parts is not particularly important; what is important is that the surrounding ring means provides support and defines the internal groove which receives the clamp means. Moreover, the passages 49 are included to evacuate air or water trapped on the outside the clamp means. The passage 50 is included to introduce fluid under pressure for clamp means inflation. The embodiment 48 includes the back wall 51 which is wider than the outer face. Again, the side walls are identified at 52 and have the corrugations extending along them. The outer face 53 is constructed differently, namely, having a more narrow width. The numeral 54 identifies an edge located shoulder around the outer face. The shoulder 54 abuts against a seal ring 55. The ring 55 is caught by an undercut shoulder at 56 in the groove so that the shoulders 54 and 56, facing one another, clamp the sacrificial seal ring 55. The ring 55 is thus received in the groove, caught between the facing shoulders 54 and 56. The ring 55 is made of a sacrificial material which is relatively soft compared to the metal parts. A soft metal will suffice, or a hard plastic will also accomplish the purpose. When pressure fluid is introduced to the interior of the clamp means, the side walls 52 are straightened, and the shoulder 54 is driven towards the pipe 11. The shoulder 54 causes the seal ring to be pinched, thereby deforming the seal ring as it wraps more fully around the edge of the outer face. It is extruded to the exterior and thus it deforms to the shape shown in FIG. 9. This deformation causes the seal ring 55 to seal against water leakage along the interface of the groove which surrounds the clamp means. A duplicate seal ring is accomplished at the opposite side on the opposing edge so that the two seal rings together provide the kind of sealing action which is necessary and appropriate.

Figure 9:
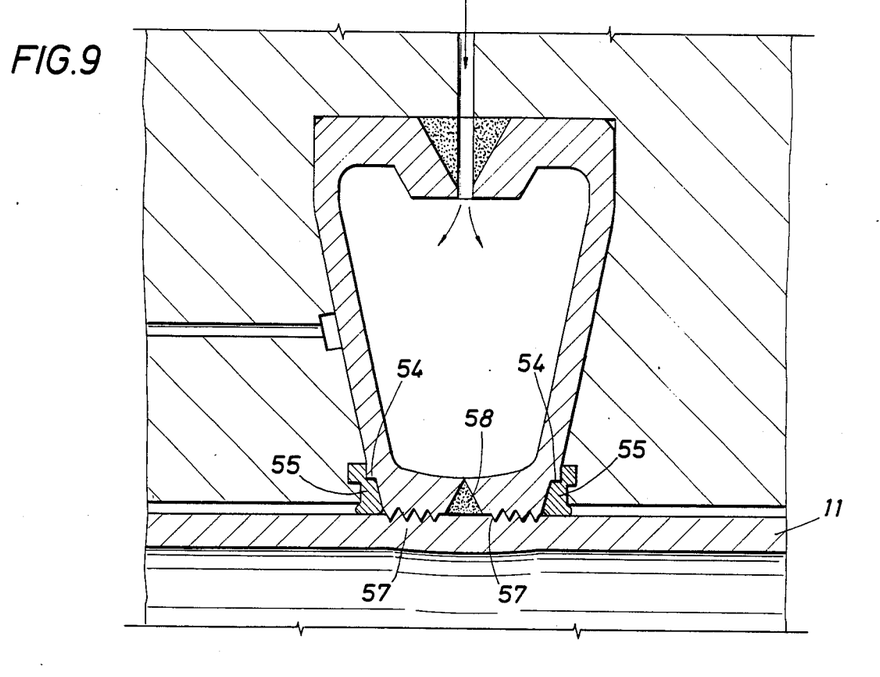
FIG. 9 is a view similar to FIG. 8 showing the device after operation to achieve clamping by embedment of the outer face in the pipe.

As will be shown in contrast between FIGS. 8 and 9, the seal rings 55 are distorted to assure sealing so that leakage does not occur around the exterior of the clamp means. They additionally aid and assist in locking and sealing the serrated teeth 57 which embed into the pipe 11. The teeth are preferably grouped in two sets as shown in the drawings. The two sets are parallel to one another, and are divided by a welded bean 58 between the two sets of teeth. This enables relatively easy construction of a clamp means. It should be kept in mind that the clamp means is a fully encircling structure which is hollow and ring-like. It is best manufactured of multiple pieces and to this end, two piece construction is implied in the arrangement shown in FIGS. 8 and 9.

Figure 10:
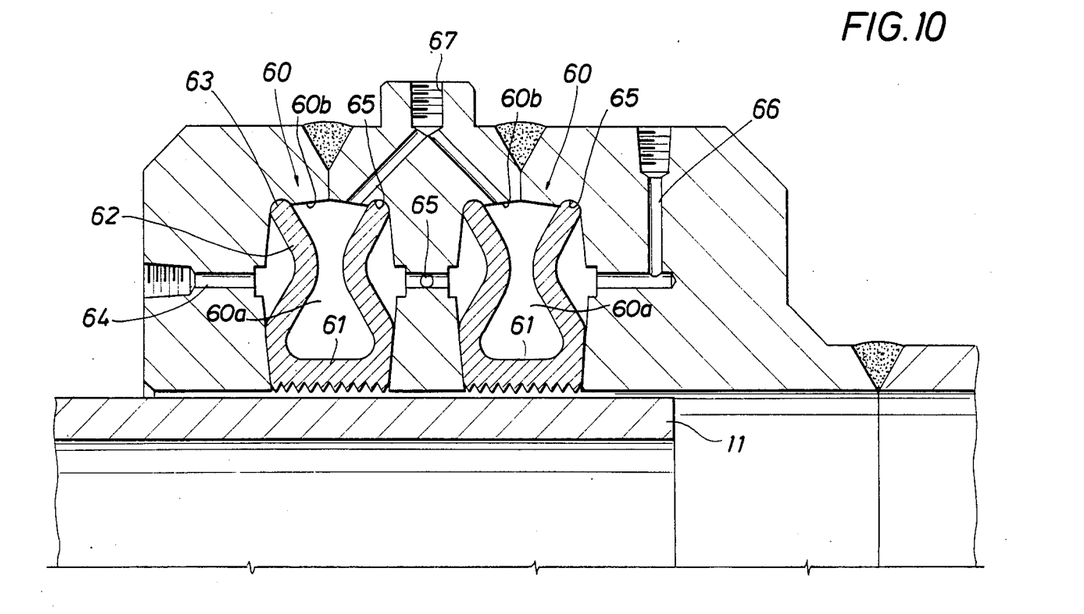
FIG. 10 shows a third embodiment wherein slightly modified clamp means are set forth, and in this instance there are two parallel clamp means for engaging the pipe.

Attention is next directed to FIG. 10 of the drawings. There, a dual clamp means arrangement is illustrated and shown. In the arrangement of FIG. 8, the numeral 60 identifies a single clamp means or diaphragm. It is duplicated and the description of one will suffice for the other. Here, the clamp means is again received in a groove. This differs in that the clamp means is of U-shaped construction having an outer face 61 and duplicate side walls 62. The side walls 62 terminate at a bead 63. The bead 63 is received in a conforming, shallow annular channel 65 cut for that purpose in the annular engagement surface 60b surrounding and partially the groove of the ring means. Thus, no back wall is included as was shown in the embodiment of FIG. 8; the back wall is avoided because the bead 63 is sealingly received in the indentation conforming to it whereby the interior of the clamp means 60 is isolated to form an annular chamber 60a. Thus, the diaphragm is formed by the engagement surface 60b together with walls 62 and the end wall defining outer face 61. The clamp means 60 is constructed with the corrugated side walls 62 are previously described. It will be further observed that the side walls of the groove which encloses the clamp means are tapered at the bottom and yet flare out at the top. They are shaped almost oppositely of the corragation formed in the side wall; this defines a relatively large open interior cavity which is evacuated by the outlet line 64. The opposite cavity is likewise evacuated by the outlet line 65. The duplex arrangement shown in FIG. 10 utilizes the line 65 to evacuate both of the adjacent groove means. Corresponding to the passage 64, a similar passage 66 is included for additional evacuation purposes. Conveniently, the numeral 67 identifies an inlet passage which is split, thereby introducing fluid under pressure to both of the duplicated clamp means. The passage 67 terminates at a suitable threaded member to enable easy connection for a pressure source.

Figure 11:
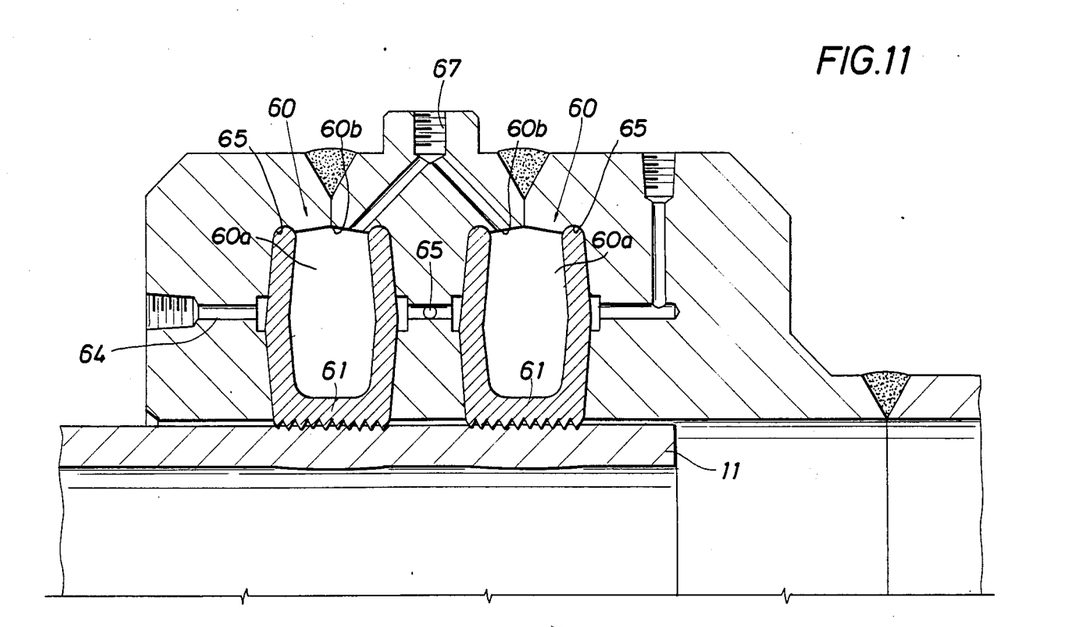
FIG. 11 is a view similar to FIG. 10 showing the device after the pipe has been clamped by the duplicate pair.

The embodiment shown in FIG. 10 depicts the outer face retracted. By contrast, the outer face 61 in FIG. 11 is extended, embedding in the pipe 11 and taking a tight grip on the pipe. This driving arrangement assures that the pipe 11 is gripped, not only once, but in actuality twice because there are two of the clamp means included in the embodiment shown in FIG. 10. In general terms, this embodiment is different in the construction of the clamp means which is preferably fabricated as the U-shaped member shown in FIGS. 10 and 11. It is sealingly held within the groove so that no leakage occurs and that pressure is held whereby expansion of the clamp means is achieved.

Figure 12:
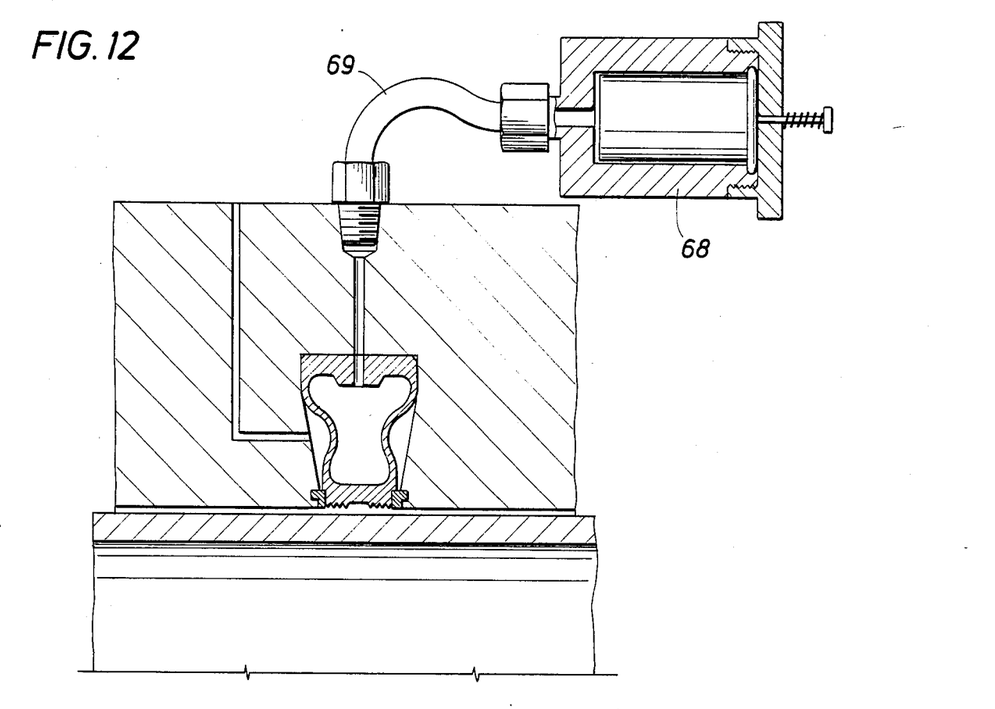
FIG. 12 shows one mechanism for providing pressure to the clamp apparatus of this disclosure for setting the clamp apparatus.
Figure 13:
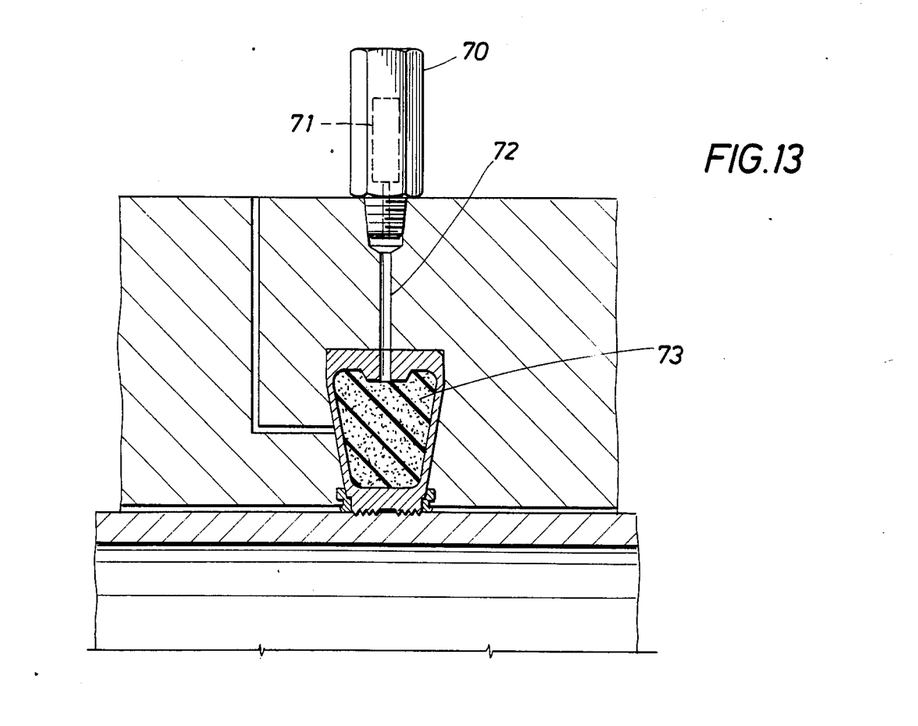
FIG. 13 shows an alternate form of pressure setting apparatus.

Attention is next directed to FIG. 12 of the drawings. There, the numeral 68 identifies a hydraulic fluid pressure source which is connected through a suitable tubing 69 and threaded fitting for delivery of hydraulic fluid to the interior of the clamp means shown in FIG. 12. A typical pressure for setting might exceed 10,000 psi. To this end, the means 68 in FIG. 12 is a type of positive displacement pump capable of achieving the requisite pressure to set the apparatus. Hydraulic pressure is one technique for setting the apparatus. FIG. 13, however, shows an alternate embodiment. In FIG. 13, a closed housing 70 seals and holds an ignition charge 71. It forms a firefront which is fed through a suitable passage 72 into the interior of the clamp means. The interior is filled with material identified at 73. Before ignition, this combustion material is relatively loose in the clamp means and it expands to fill the clamp means to assure a very high pressure. A homogeneous mixture of a thermosetting plastic material can be used. Mixed with a combustable material such as black powder, alternatively sulphur and other combustables and also mixed with a bubble-generating chemical such as a perchlorate salt, the application of heat or fire through the conduit 72 to the materials 73 sets off the material and ignites it. When ignited, the thermosetting plastic material is foamed and expanded. This is accompanied with the release of volumes of gas from the perchlorate or other gas liberating compound in small bubbles. The gas typically forms bubbles in the plastic material. When the expansion has completed, the plastic material takes a rigid shape which fills the cavity and assures that the side walls are propped outwardly, thereby preventing collapse. Moreover, the plastic takes a set. Thus, the arrangement shown in FIG. 13 accomplishes expansion of the clamp means and fills the interior cavity with a material which holds it in the expanded state.

Figure 14:
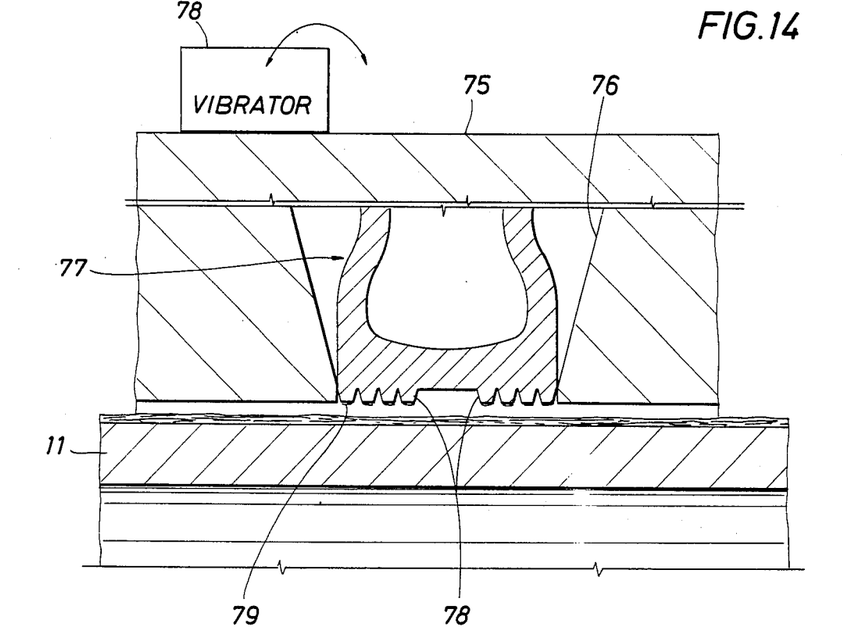
FIG. 14 shows a modified form of gripping teeth on the outer face which, in conjunction with a vibrator means, cut through mill scale, rust, and other debris on the surface of the pipe to assure a good grip achieved on setting of the device.
Figure 15:
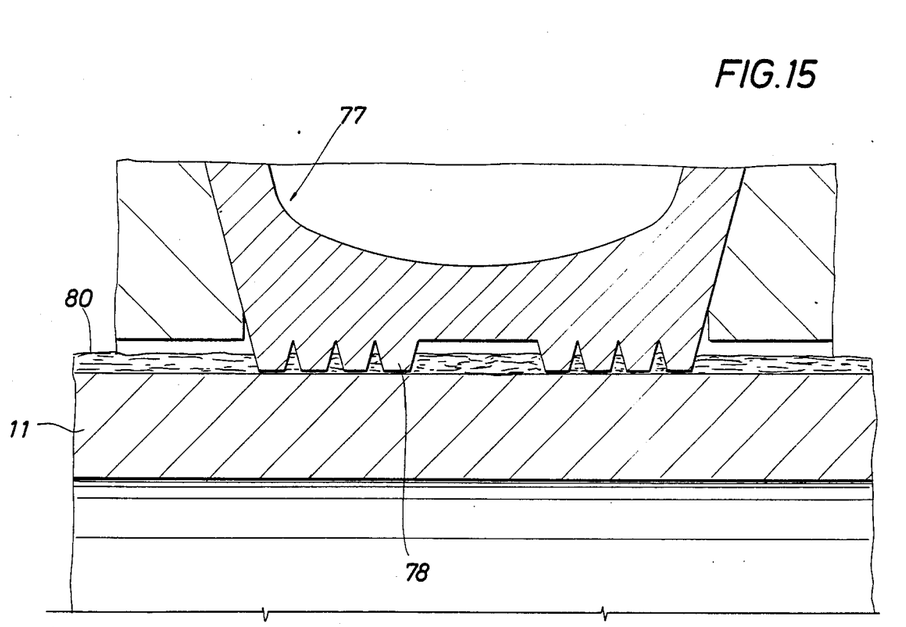
FIG. 15 is a view of FIG. 14 showing detailed construction of tooth embedment into the pipe.

Attention is now directed to FIGS. 14 and 15 jointly. There, the ring means is identified generally by the numeral 75 while the groove is identified by the numeral 76. The clamp means is identified generally by the numeral 77 and is located in the groove means 76. The ring means 75 supports a vibrator which imparts vibrations to the clamp means. The clamp means 77 is equipped with teeth 78 which have been cut across at the crown and the outer exposed face of the teeth is coated with an abrasive material such as tungsten carbide particles secured to the teeth by means of a suitable glue or the like. The vibrator is operated so that vibrations run parallel to the teeth. That is, oscillating movement whereby the teeth 78 rub against the contacted surface is accomplished. The teeth are vibrated so that they form an abrasive cut in the opposing material of the pipe. Again, the pipe is identified by the numeral 11 in FIG. 15, and is shown with an exaggerated thickness of mill scale, trash and other debris at 80. This material forms on the exterior of the pipe 11. The teeth 78 cut into the material, aided and assisted by the vibratory motion and the tungsten carbide particles which accomplish cutting. Cutting is achieved whereby the thickness of the mill scale and other debris is markedly reduced. This is done before the device is operated, meaning before the clamp means are expanded and thereby tightened. When the tightening occurs, the teeth have better clearance through the scale and debris on the surface and are able to bite into metal without impediment by the trash and mill scale on the exterior. This contrast is best shown by comparing FIGS. 14 and 15.

Figure 16:
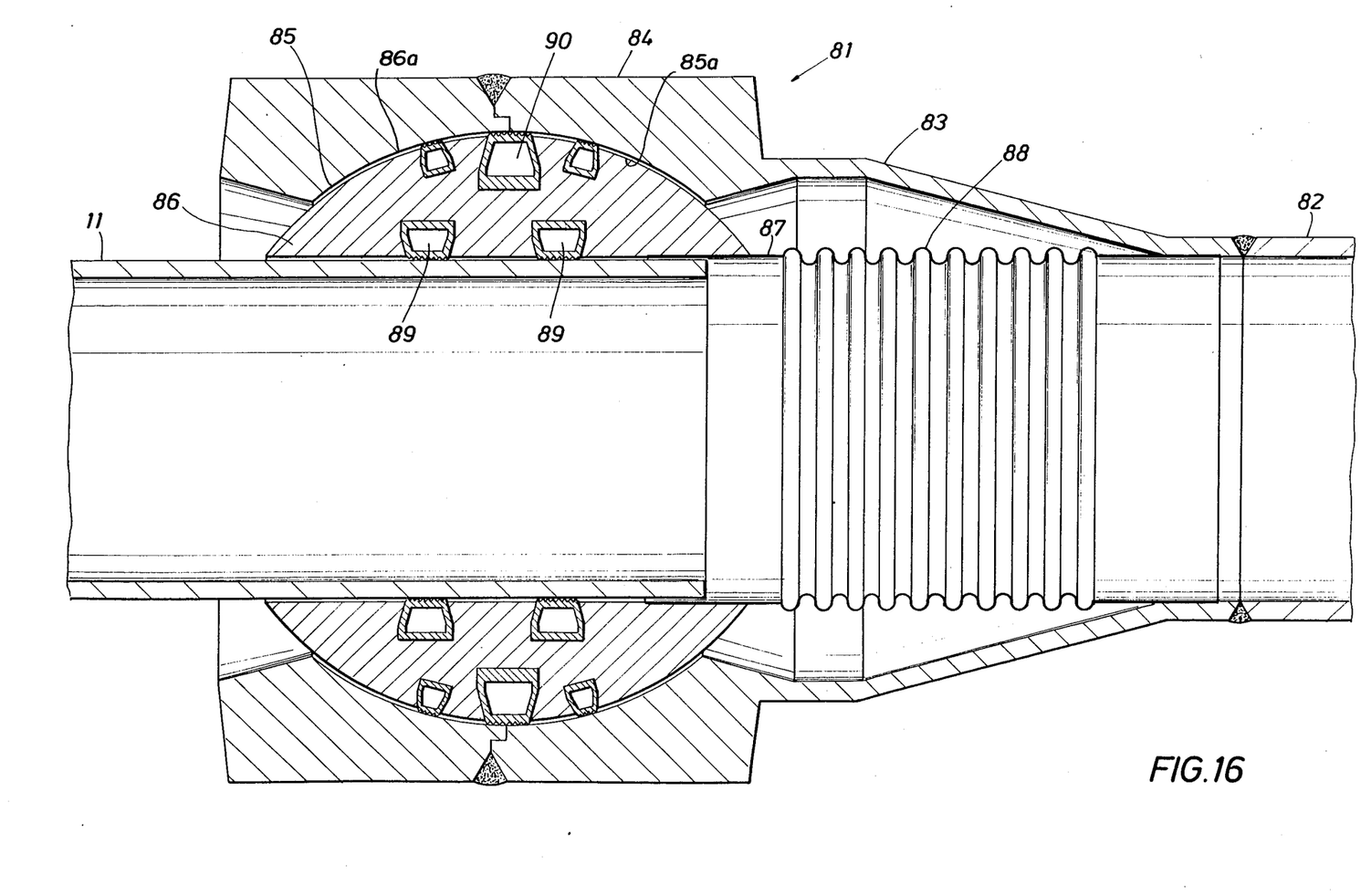
FIG. 16 shows in sectional view a pipe connective apparatus to accommodate slightly misaligned pipes in an underwater connection utilizing the seal apparatus of this disclosure.

In FIG. 16 of the drawings, the numeral 81 identifies in general a connector accommodating misalignment between two pipes. One pipe is identified at the left by the numeral 11. At the right hand side, a second pipe is identified by the numeral 82. Angular misalignment between the pipes 11 and 82 can be accommodated. The pipe 82 can either be a pipe or a telescoping skirt which fits over a pipe. In either case, two pipes can be connected and misalignment accommodated. The numeral 83 identifies a flaring skirt which is affixed to a ring-like member 84. The ring-like member 84 comprises an external housing for the connector apparatus. It will be termed the housing by virtue of the fact that it encloses the remainder of the apparatus. It is cylindrical in profile on the exterior, but on the interior, it includes a spherical cavity at 85 having an inner spherical surface 85a. The cavity 85 is adapted to receive and to surround a sphere 86 which is located therein and supported in the manner to be described. The sphere 86 has a spherical external surface 86a except that it is interrupted with an axial hollow bore and enabled to surround the pipe 11. The sphere 86 telescopes over the pipe 11 prior to sealing. The sphere 86 connects with a transition tubular member 87 which in turn connects with a serrated portion 88. The serrations 88 enable telescoping and bending of the extension. It is relatively thin wall material and terminates near the weld which affixes the sleeve 82. The enables angular misalignment and axial displacement to be accommodated. Such accommodation occurs at the serrations 88 on flex bending or extension.

The present invention (the clamp means) is incorporated at two locations. For purposes of gripping the pipe, the sphere 86 is held to the pipe by means of duplicate clamping means 89. The duplicate clamp means at 89 extend radially outwardly toward the pipe 11 for gripping or clamping the pipe 11. Preferably, the pipe 11 is stabbed through the equipment to a required depth. By provision of suitable pressure (through a route not illustrated), the clamp means 89 are actuated to a sealing position. This secures the sphere 86 to the pipe 11. At this juncture, the sphere is free to rotate and deflect upon misalignment of the center lines of the pipes 11 and 82. Once a position is required, the sphere 86 can be locked at a particular angle with respect to the housing 84. This achieved by actuating additional clamp means 90 which are shown in FIG. 16. In other words, the sphere 86 supports two sets of clamp means. One set of clamp means is directed radially inwardly towards the pipe 11 for gripping and sealing against it. In addition, a second set of clamp means is included at 90 and they are positioned and located so that they grip and clamp against the surrounding housing 84. This seals against leakage along the interior or exterior of the sphere 86. There will be no leakage along either leakage route once the clamp means 89 and 90 have been set.

Figure 17:
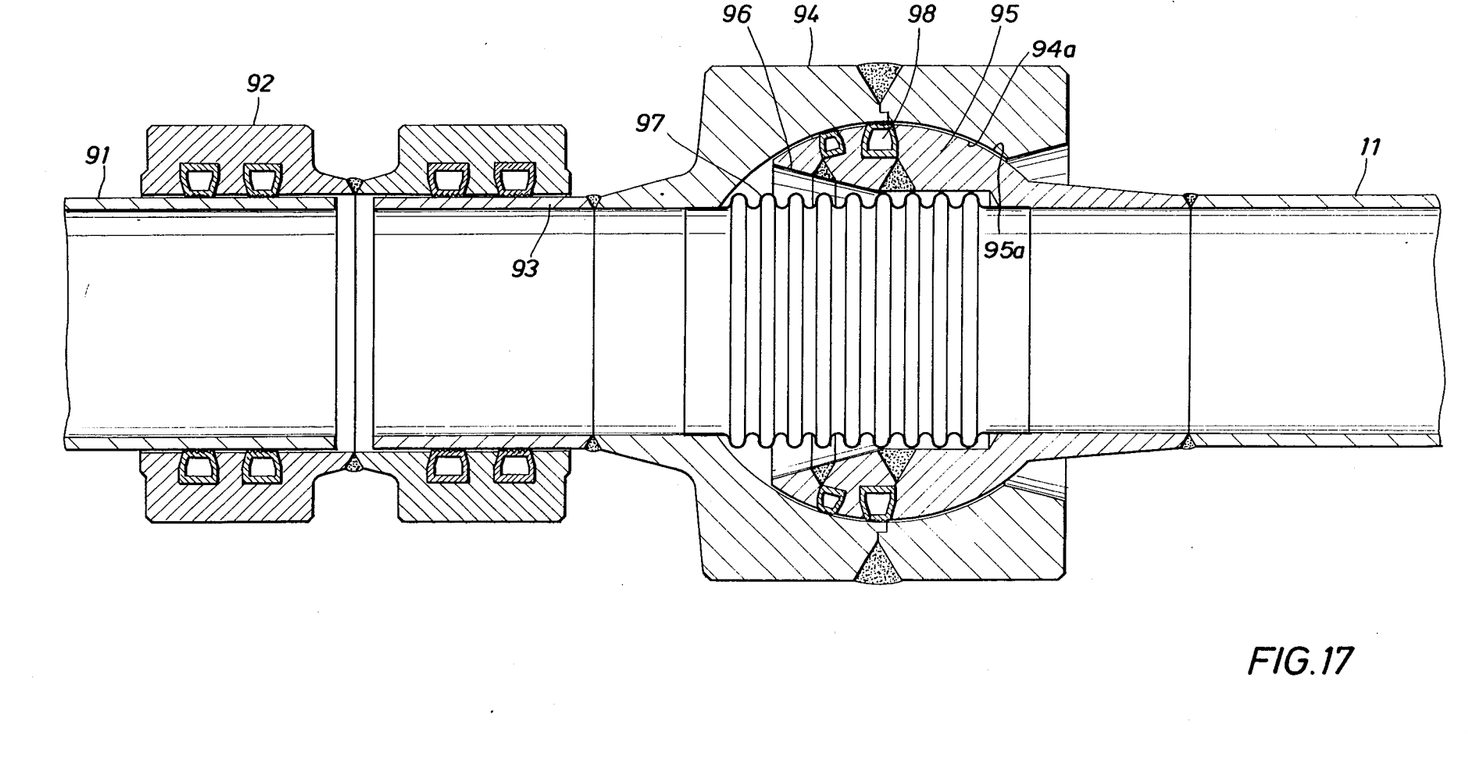
FIG. 17 shows an alternate embodiment pipe connecting apparatus utilizing the seal means of this disclosure at multiple locations to achieve connection between two pipes subject to misalignment and spatial offset.

Attention is next directed to FIG. 17 of the drawings which shows a connective fitting utilizing the clamp means of the present disclosure. In FIG. 17, the numeral 11 again indicates a pipe at the left hand side and a connecting pipe 91. The pipes 11 and 91 can vary in spacing and can also vary in angular misalignment. A sleeve 92 supporting multiple sets of clamp means on the interior is included to accommodate errors in spacing. The sleeve 92 fits over the end of the pipe 91 and can telescope relative to it to accommodate misalignment. In like fashion, it fits over a sleeve 93 which is affixed to a housing 94. The housing 94 has the spherical internal cavity defining an inner spherical surface 94a to receive a sphere 95 having an outer spherical surface 95a. The sphere 95 is affixed to the pipe 11 by means of a tapered transition portion joined at a weld, and the sphere 95 is chamfered at 96 to accommodate angular deflection of the sphere. The sphere 95 is able to rotate to accommodate misalignment whereupon the chamfered flared surface at 96 bends the serrated transition tubular member 97 to accommodate the curvature. The member 97 is relatively thin wall, and is concentric on the interior of the sphere 95. It terminates at a suitable axial passage in the housing 94. The clamp 98 seals between the housing 94 and the sphere 95. This prevents leakage on the exterior of the sphere. On the interior, the thin wall sleeve 97 prevents leakage along the interior.

As will be observed in FIGS. 16 and 17, complete connective tools have been provided. They are connective tools which utilize a sphere and surrounding housing with mating spherical cavity to accommodate angular misalignments such as misalignment of about 15° to 18°. Not only that, but axial misalignment can also be accommodated through the incorporation of the sleeve 92 as exemplified in FIG. 17. In either case, the arrangement of the components utilizes the clamp means of the present disclosure received within a groove formed in a surrounding ring member. As will be observed consistent with the rest of this disclosure, the clamp means has a retracted position where it is relatively large and able to fit loosely. However, when actuated, it clamps down on the opposing pipe or other circular member to achieve a grip or seal which is made fast by virtue of the embedment of teeth in the outer face of the clamp means into the opposing pipe or other circular structure. Through this arrangement, a quality clamping arrangement can be utilized and defined whereby the entire connection is made fast and secured for leakproof installation under water. Once the device has been actuated, there is no need to maintain further pressure on the clamp means. Thus, the pressure builds to a peak and is held momentarily. Thereafter, the pressure collapses because the side walls have been straightened and clamping action has been completed. Clamping is achieved in relatively short order because only a peak pressure of a duration of a few seconds is required. Indeed, a pressure setting arrangement for just a fraction of a second to perhaps two or three seconds will suffice.

While the foregoing is directed to the preferred embodiment, the scope is determined by the claims which follow:

What is claimed is:

1. An assembly for connecting to a cylindrical tubular member comprising:
   metallic collar means for surrounding said tubular member, said collar means including a radially inwardly opening annular groove and an annularly extending engagement surface partially defining said groove, and facing said tubular member;
   an annular metallic diaphragm positioned in said groove, said diaphragm, at least partially, defining an annular chamber, said diaphragm including first and second generally radially disposed, annularly extending side walls and an annularly extending end wall facing said tubular member, each of said side walls including a first annularly extending run and a second annularly extending run, said first and second side walls being movable from a first rigid position in which said first and second runs are at an angle to one another to a second, rigid position in which said first and second runs are substantially aligned with one another, said side walls in said second position forming generally radially disposed, annularly extending struts in compression between said engagement surface in said collar and said tubular member; and
   means to expand said annular chamber to move said first and second side walls from said first to said second position.

2. The assembly of claim 1 wherein said end wall includes teeth means for biting into said tubular member when said first and second side walls are moved to said second position.

3. The assembly of claim 1 wherein each of said first and second side walls include a plurality of circumferentially spaced reliefs.

4. The assembly of claim 1 wherein said annular groove in said collar is tapered radially outwardly.

5. The assembly of claim 1 wherein said metallic collar further includes first and second abutment walls, said first and second abutment walls and said engagement surface defining said annular groove, said first and second abutment walls limiting movement of said first and second side walls, respectively, when said first and second side walls are moved to said second position.

6. The assembly of claim 5 wherein said groove is tapered radially outwardly, said first and second abutment surfaces forming converging frustoconical surfaces.

7. The assembly of claim 1 wherein said metallic diaphragm is partially defined by said engagement surface facing said tubular member.

8. The assembly of claim 1 wherein said means to expand said annular chamber includes means to introduce a noncompressible medium into said annular chamber.

9. The assembly of claim 1 wherein said means to expand said annular chamber includes a combustible medium disposed in said chamber and means to ignite said combustible medium.

10. The assembly of claim 1 further including a second tubular member secured to said collar means whereby said tubular member and said second tubular member may be operatively connected to one another.

11. The assembly of claim 1 including means to relieve pressure from said annular groove externally of said diaphragm.

12. The assembly of claim 1 wherein said end wall, in said first position, defines a generally shallow, annularly extending depression and there is an insert received in said depression, said end wall being forced radially inwardly in said second position such that said insert engages said tubular member.

13. An assembly for effecting metal to metal seal between inner and outer spherical surface comprising:
    a first metallic member defining a cavity, said cavity being at least partially defined by an inner spherical surface;
    a second metallic member having an outer spherical surface, the portion of said second member having said outer spherical surface being received in said cavity in said first member, said inner and outer spherical surfaces being generally in register with one another to generally form a ball and socket arrangement, said second member including a radially outwardly opening annular groove and an annularly extending engagement surface facing said inner spherical surface; and
    an annular metallic diaphragm received in said groove, said diaphragm, at least partially, defining an annular chamber, said diaphragm including first and second generally radially disposed, annularly extending side walls and an annularly extending end wall facing said inner spherical surface, each of said side walls including a first annularly extending run and a second annularly extending run, said first and second side walls being movable from a first rigid position in which said first and second runs are at an angle to one another to a second, rigid position in which said first and second runs are substantially aligned with one another, said side walls in said second position forming annularly extending struts in compression between said engagement surface in said first member and said inner spherical surface; and
    means to expand said annular chamber to move said first and second side walls from said first to said second position.

14. The assembly of claim 13 wherein said end wall includes teeth means for biting into said inner spherical surface when said first and second side walls are moved to said second position.

15. The assembly of claim 13 wherein each of said first and second side walls include a plurality of circumferentially spaced reliefs.

16. The assembly of claim 13 wherein said annular groove in said second member is tapered radially outwardly.

17. The assembly of claim 13 wherein second member further includes first and second abutment walls, said first and second abutment walls and said engagement surface defining said annular groove, said first and second abutment surfaces limiting movement of said first and second side walls respectively, when said first and second side walls are moved to said second position.

18. The assembly of claim 17 wherein said annular groove is taperd outwardly, said first and second abutment surfaces forming converging frustoconical surfaces.

19. The assembly of claim 13 wherein said metallic diaphragm is partially defined by said engagement surface facing said inner spherical surface.

20. The assembly of claim 13 wherein said means to expand said annular chamber includes means to introduce a noncompressible medium into said annular chamber.

21. The assembly of claim 13 wherein said means to expand said annular chamber includes a combustible medium disposed in said chamber and means to ignite said combustible medium.

22. The assembly of claim 13 including means to relieve pressure from said annular groove externally of said diaphragm.

23. The assembly of claim 13 wherein said end wall, in said first position, defines a generally shallow, annularly extending depression and there is an insert received in said depression, said end wall being forced radially outwardly in said second position such that said insert engages said inner spherical surface.

* * * * *